United States Patent [19]
Zahid

[11] 3,937,496
[45] Feb. 10, 1976

[54] FLEXIBLE COUPLING
[75] Inventor: Abduz Zahid, Los Angeles, Calif.
[73] Assignee: Greer Hydraulics, Inc., Los Angeles, Calif.
[22] Filed: Dec. 9, 1974
[21] Appl. No.: 530,939

[52] U.S. Cl. ............... 285/52; 285/291; 285/328
[51] Int. Cl.² ................................... F16L 19/02
[58] Field of Search .......... 285/49, 52, 54, 51, 328, 285/284, 291, 297, 354

[56] References Cited
UNITED STATES PATENTS

| | | | |
|---|---|---|---|
| 539,112 | 5/1895 | Barrett | 285/297 X |
| 1,595,310 | 8/1926 | Mueller et al. | 285/328 X |
| 2,867,463 | 1/1959 | Snider | 285/52 X |
| 3,115,354 | 12/1963 | Bowan et al. | 285/52 |
| 3,392,993 | 7/1968 | Myers | 285/297 X |
| 3,400,951 | 9/1968 | Jacobson | 285/291 X |
| 3,519,289 | 7/1970 | Haffer | 285/49 |
| 3,807,773 | 4/1974 | Brune | 285/52 |

FOREIGN PATENTS OR APPLICATIONS

| | | | |
|---|---|---|---|
| 679,504 | 2/1964 | Canada | 285/52 |
| 549,947 | 12/1957 | Canada | 285/52 |
| 320,231 | 2/1970 | Sweden | 285/52 |
| 89,677 | 6/1921 | Switzerland | 285/52 |
| 588,781 | 6/1947 | United Kingdom | 285/328 |

Primary Examiner—Thomas F. Callaghan
Attorney, Agent, or Firm—Arthur B. Colvin

[57] ABSTRACT

This invention relates to the art of pipe couplings and more particularly to a coupling that includes a first fitting to which one pipe is connected, a second fitting to which a second pipe is connected, a connector sleeve which releasably joins such fittings and a resilient member interposed between said fittings to substantially eliminate the transmittal of mechanical vibration from one of the pipes to the other pipe.

2 Claims, 5 Drawing Figures

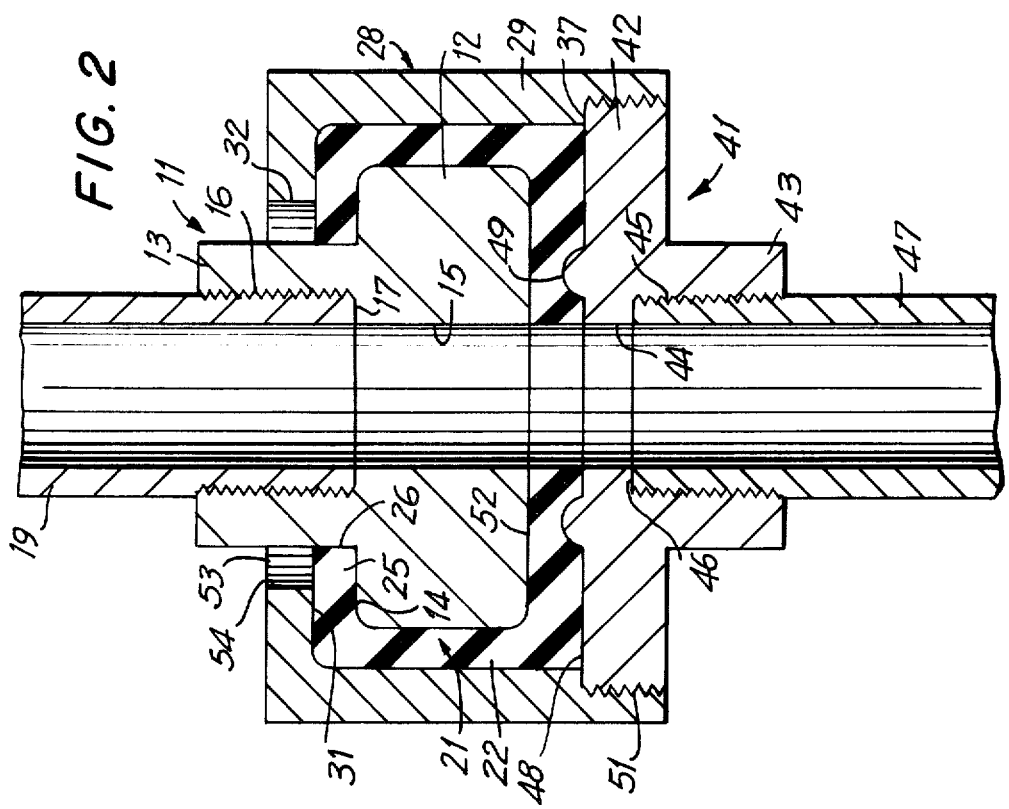
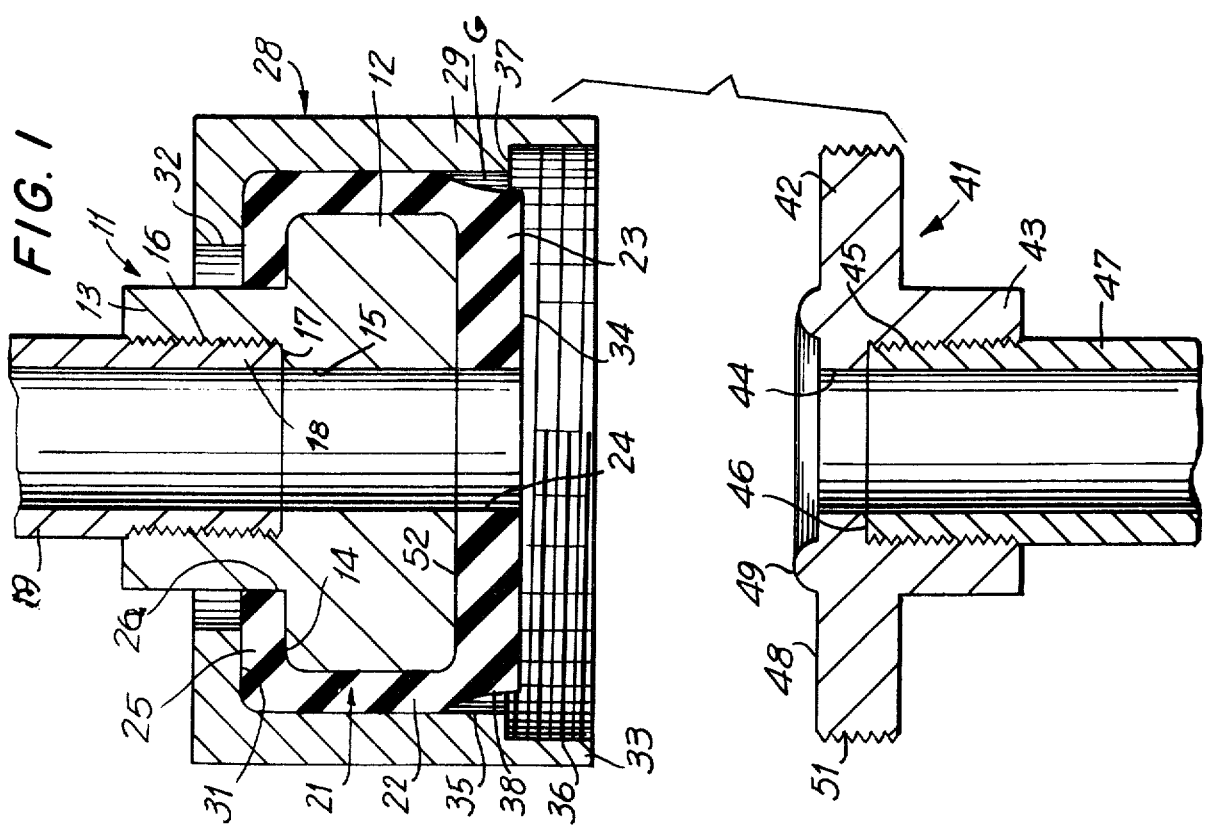

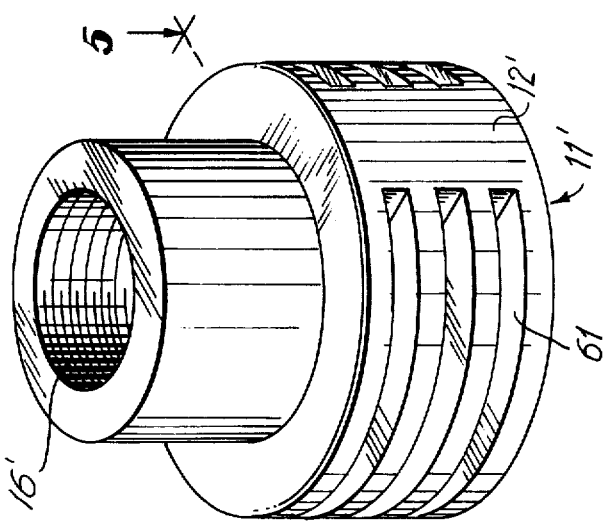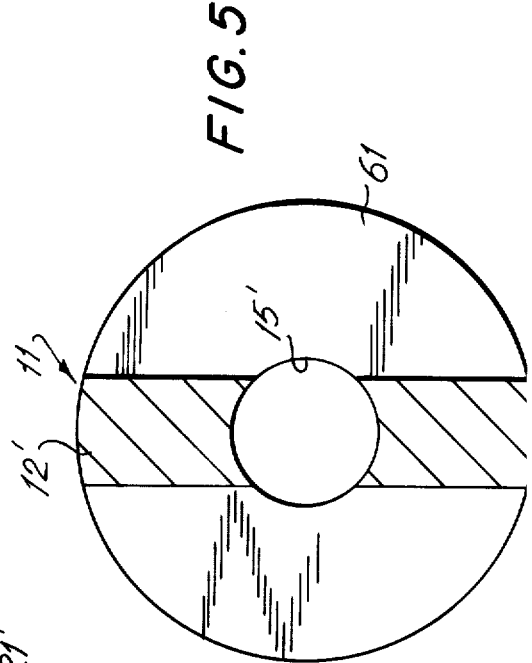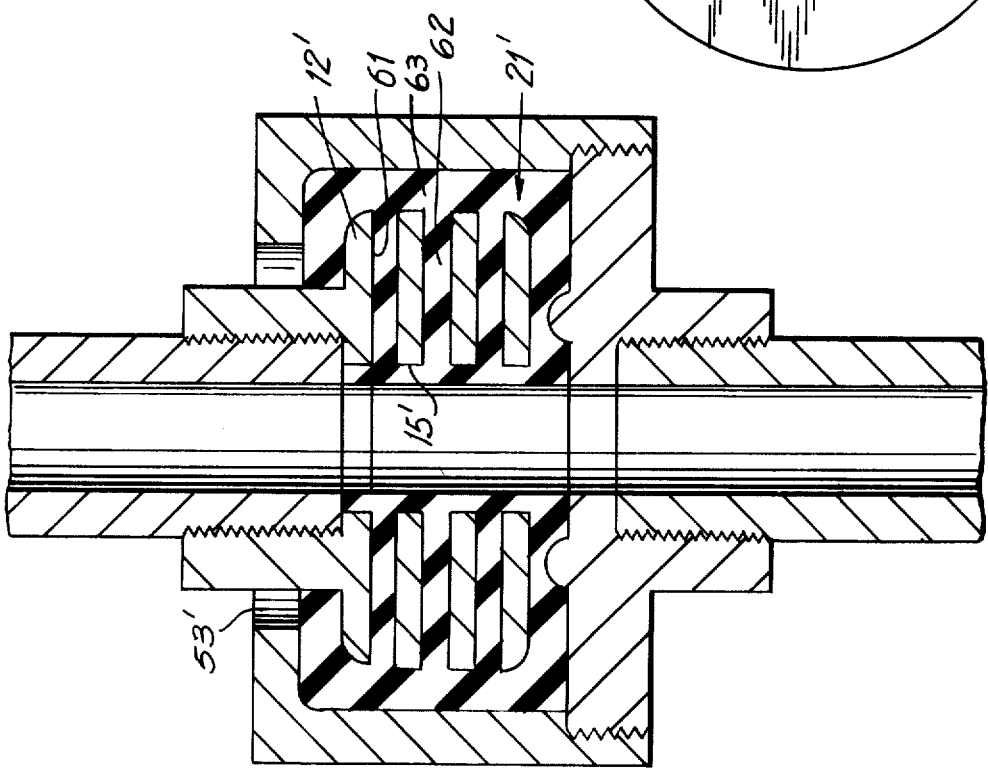

FLEXIBLE COUPLING

As conducive to an understanding of the invention, it is noted that where couplings are provided and more particularly unions to connect two pipes together, where there is metal to metal contact of the elements of the union, mechanical vibration imparted to a pipe connected to one of the elements of the union will be transmitted through another element of the union to the other pipe. Such mechanical vibration, especially when transmitted to long lengths of connected pipes can build up relatively violent oscillations with consequent pulling away of the pipes from the walls to which they may be connected and breakage of the pipes.

In addition, where two pipes are connected by a union which has no flexibility, in the event one of the pipes is at an angle with respect to the other the rigid connection provided by such a union will cause a constant stress to be imparted to the pipes which could eventually cause breakage thereof, particularly if the pipes are subject to mechanical vibration.

It is accordingly among the objects of the invention to provide a coupling device for two pipes which has relatively few elements and which may readily be fabricated at low cost and which may readily be used to connect two pipes together with the use of a conventional pipe wrench and which will dependably minimize transmittal of mechanical vibration from one of the pipes to the other and will permit the connection of two pipes that are not exactly longitudinally aligned without undue stress being imparted to said pipes.

Accordingly to the invention these objects are accomplished by the arrangement and combination of elements hereinafter described and more particularly recited in the claims.

In the accompanying drawings in which are shown one or more of various possible embodiments of the several features of the invention:

FIG. 1 is an exploded, longitudinal sectional view of the coupling according to one embodiment of the invention;

FIG. 2 is a longitudinal sectional view showing the coupling in assembled condition;

FIG. 3 is a view similar to FIG. 2 of another embodiment of the invention;

FIG. 4 is a perspective view of one of the fittings used in the embodiment of FIG. 3; and FIG. 5 is a sectional view taken along line 5—5 of FIG. 4.

Referring now to the drawings as shown in FIG. 1, the flexible coupling comprises a fitting 11 in the form of a T in cross section having a base portion 12 and a reduced diameter stem portion 13 defining an annular shoulder 14 with respect to the base portion 12.

The T-fitting 11 has an axial bore 15 extending therethrough of enlarged diameter at its outer end as at 16 defining an annular shoulder 17. The enlarged diameter portion 16 is internally threaded to receive the correspondingly threaded end 18 of a pipe 19.

Encompassing the base portion 12 of the T-fitting 13 is a substantially cup-shaped member 21 of resilient material such as natural or synthetic rubber.

The side wall 22 of resilient member 21 is substantially cylindrical in cross section as shown in FIG. 1. The floor 23 of member 21 has an axial opening 24 of diameter substantially identical to the diameter of bore 15. The mouth of member 21 has an inturned annular flange 25 defining an axial opening 26 of diameter substantially equal to the outer diameter of stem portion 13.

The length of side wall 22 of resilient member 21 is such that when the base portion 12 of T-fitting 11 is inserted into the cavity defined by the side wall 22, the floor 23 and the flange 25 of the resilient member; the base portion 12 will be snugly engaged.

Associated with the T-fitting 11 and the encompassing resilient member 21 is a connector 28 in the form of a sleeve 29 of inner diameter just slightly larger than that of the side wall 22 of member 21 so that it may readily encompass such side wall.

The sleeve 29 has an inturned annular flange 31 at one end which defines an axial opening 32 of diameter greater than the outer diameter of stem portion 13 and less than the outer diameter of base portion 12.

The sleeve 29 is of length such that it is positioned over the base portion 12 and the encompassing resilient member 21 with the annular flange 31 thereof seated on the annular flange 25, the end 33 of the sleeve will extend longitudinally beyond the outer surface 34 of floor 23 of resilient member 21.

As shown in FIG. 1, the bore 35 of sleeve 29 is of enlarged diameter as at 36 at the end 33 thereof defining an annular shoulder 37, the latter in a transverse plane that is positioned longitudinally inwardly of the plane of the outer surface 34 of floor 23 of member 21. The periphery of the side wall 22 of member 21 adjacent the floor 23 is beveled inwardly as at 38 for the purpose hereinafter to be described.

Coacting with the connector 28 is a clamp fitting 41 which is also T-shaped in cross section having a base portion 42 and a reduced diameter stem portion 43.

The clamp fitting 41 has an axial bore 44 extending therethrough of diameter illustratively the same as that of bore 15, the bore 44 being of enlarged diameter at its outer end as at 45 defining an annular shoulder 46. The enlarged diameter portion 45 is internally threaded to receive the correspondingly threaded end of a pipe 47.

The base portion 42 has on its outer surface 48 an outstanding annular base 49 and the periphery of base portion 42 is threaded as at 51 so that it may be screwed into the correspondingly threaded portion 36 of connector 28.

To assemble the coupling shown in FIGS. 1 and 2, it is to be noted that after the resilient member 21 is mounted on base portion 12 and the connector 28 positioned over the resilient member 21 with the flange 31 of connector 28 resting on flange 25 of the resilient member, the outer surface 34 of floor 23 of the resilient member 21 will extend beyond the annular shoulder 37 of the connector member 28.

Thereupon, the threaded stem 13 of fitting 11, with the connector member 28 thereon, is screwed onto the threaded end of pipe 19. The base portion 42 of fitting 41, which has the threaded end of pipe 47 screwed into the threaded stem portion 43, is positioned in juxtaposition to the end 33 of connector member 28. The connector member is then rotated to screw onto the threaded periphery 51 of base portion 42.

As a result, as the base portion 42 of the clamp fitting 41 is screwed into the threaded portion 36 of connector 28, the annular boss 49 will first press into the outer surface of floor 23. The inward movement of the base portion 42 is limited by the abutment thereof against annular shoulder 37 and hence the material of the floor 23 and flange 25 of resilient member 21 will not be excessively compressed.

With the base portion 42 seated on annular shoulder 37, the floor 23 of the resilient member 21 will be compressed against the undersurface 52 of base portion 12 of T-fitting 11 and the flange 25 will be compressed between shoulder 14 and flange 31.

By reason of the gap G provided by the beveled portion 38 of the floor 23 of resilient member 28, movement of the material therof under compression will be accommodated as shown in FIG. 2.

It is to be noted that the diameter of opening 32 is less than the diameter of base portion 12 of fitting 11. If for some reason force should be exerted against either or both of the pipes 19, 47 which would tend to pull them apart, even if such force was sufficient to cause the rigid flange 31 to shear the resilient flange 25, the flange 31 would abut against the top surface of base portion 12, which is of larger diameter than opening 32 so that the pipes 19, 47 would still remain connected.

With the construction above described it is apparent that two pipes 19 and 47 can be connected with a substantial reduction in the transmittal of any mechanical vibration to which one of the pipes is subjected, to the other pipe.

This reduction in the transmittal of mechanical vibration is due to the fact that there is no rigid metal to metal connection between the two pipes but rather the connection is through the interposed resilient member 21 as shown in FIG. 2.

Furthermore, even if the two pipes 19, 47 are not longitudinally aligned they still may be readily connected by the coupling 11 since lateral movement is permitted by the clearance 53 between the periphery 54 of flange 31 and the stem portion 13. As a result, if the pipe 19, for example, should be slightly tilted to the left (referring to FIG. 2) with respect to pipe 47, as the fittings 11 and 41 are joined by tightening of connector member 28, due to the resilient member 21, the base portion 12 will readily tilt, the resilient material of member 21 readily absorbing such movement.

Although the cup shaped resilient member 21 may readily be mounted on the base portion 12 without need for bonding, it is within the scope of the invention to mold the base member 12 and cup shaped resilient member 21 as an integral unit.

To this end, in the embodiment shown in FIG. 3 to 5, in which corresponding elements have the same reference numerals primed, the base portion 12' has a plurality of circumferentially spaced columns of slots 61 therethrough extending from the outer periphery of the base portion into the bore 15' thereof.

When the resilient member 21' is molded integrally with the T-fitting 11', the slots 61 will be filled with the resilient material as at 62 and the inner or bore surface of the fitting 11' will have a layer or sleeve 63 or resilient material bonded thereto and formed integrally with the materially 62 in the slots and the layer 63 of resilient material bonded to the outer surfaces of the T-fitting 11'.

As a result of the method of forming the resilient member 21' shown in FIG. 3, the latter will be securely anchored to the T-fitting 11' and any remote chance that excessive build-up of pressure in the bore 15' could cause extrusion of the resilient member 21' through the clearance 53' would be precluded.

Haums thus desribed my invention, what I claim as new and desire to secure by Letters Patent of the United States is:

1. A pipe coupling comprising a first fitting having a base portion with a reduced diameter stem extending outwardly from one surface thereof for receiving a pipe end, and defining an annular shoulder at the root end of said stem, said fitting having an axial bore therethrough, a second fitting having a circular base portion threaded on its outer periphery, said second fitting having an axial bore, said second fitting including on the base portion thereof an annular bead closely surrounding said bore, said bead projecting in the direction of the axis of said fitting beyond the surface of said base portion, a pipe receiver portion on said second fitting, a cylindrical connector sleeve encompassing said base portion of said first fitting and having an inwardly extending annular flange at one end defining an opening of diameter less than the diameter of said base portion of said first fitting, and through which said stem extends, internal thread means formed on said other end of said connector sleeve adapted to receive said threaded outer periphery of said second fitting axially, displaceably to connect said second fitting and said sleeve, and a resilient, deformable member encompassing said base portion of said first fitting and having an axial bore aligned with and forming a continuation of the axial bores of said first and second fittings, said member including a cylindrical floor engaging said base portion of said second fitting, said floor including an annular recessed bevel portion of lesser diameter than the diameter of the remainder of said floor, said bevel portion, in the unstressed condition of said deformable member, being of lesser diameter than the inner diameter of said connector sleeve, increments of said bevel portion being pressed into engagement with said inner diameter of said sleeve and said bead being embedded into the body of said floor when said deformable member is compressed between said fittings.

2. Apparatus in accordance with claim 1 wherein said base portion of said first fitting includes at least one slot formed therethrough and said resilient, deformable member is molded in situ over said base portion.

* * * * *